United States Patent
Cunningham et al.

[11] 3,956,130
[45] May 11, 1976

[54] FILTERING APPARATUS

[75] Inventors: Robert F. Cunningham, Atlanta; Edward J. Walsh, Dunwoody; C. Samuel Graham, Stone Mountain; Willie D. Slayton; Adrian Hailine, both of Atlanta, all of Ga.

[73] Assignee: The United States of America as represented by the Department of Health, Education and Welfare, Washington, D.C.

[22] Filed: June 27, 1974

[21] Appl. No.: 483,871

Related U.S. Application Data

[63] Continuation-in-part of Ser. No. 186,283, Oct. 4, 1971, abandoned.

[52] U.S. Cl. .............. 210/198 R; 210/DIG. 24; 210/257 R; 210/416; 210/418
[51] Int. Cl.² ......................................... B01D 29/42
[58] Field of Search ............ 210/94, 97, 416 R, 450, 210/473, 474, 198, 257, 418

[56] References Cited
UNITED STATES PATENTS

| | | | |
|---|---|---|---|
| 888,259 | 5/1908 | Fauthonier | 210/473 X |
| 2,202,055 | 5/1940 | Juffa | 210/473 X |
| 2,649,205 | 8/1953 | Quinn | 210/416 X |
| 2,781,312 | 2/1957 | Klumb et al. | 210/416 X |
| 3,098,819 | 7/1963 | Sager | 210/97 |
| 3,120,489 | 2/1964 | Hoch | 210/416 X |
| 3,257,170 | 6/1966 | Marcus et al. | 210/424 X |
| 3,437,211 | 4/1969 | Lindsey | 210/474 X |
| 3,512,940 | 5/1970 | Shapiro | 210/450 X |

*Primary Examiner*—Theodore A. Granger
*Attorney, Agent, or Firm*—Browdy and Neimark

[57] ABSTRACT

An automatic filtering apparatus which provides an aliquot of filtrate of a particular quantity desired is provided. A solid-liquid mixture is introduced to a filter means under positive air pressure to provide the liquid filtrate. The filtrate flows into a receiving means defining the volume of the particular quantity desired. Excess filtrate flows into an overflow reservoir and out a waste line connected thereto. The filtrate in the receiving means can be transferred into a delivery means. Advantageously, a three-way stop-cock is disposed between the filter receiving means and delivery means and the flow paths are determined by the position of the stop-cock.

11 Claims, 1 Drawing Figure

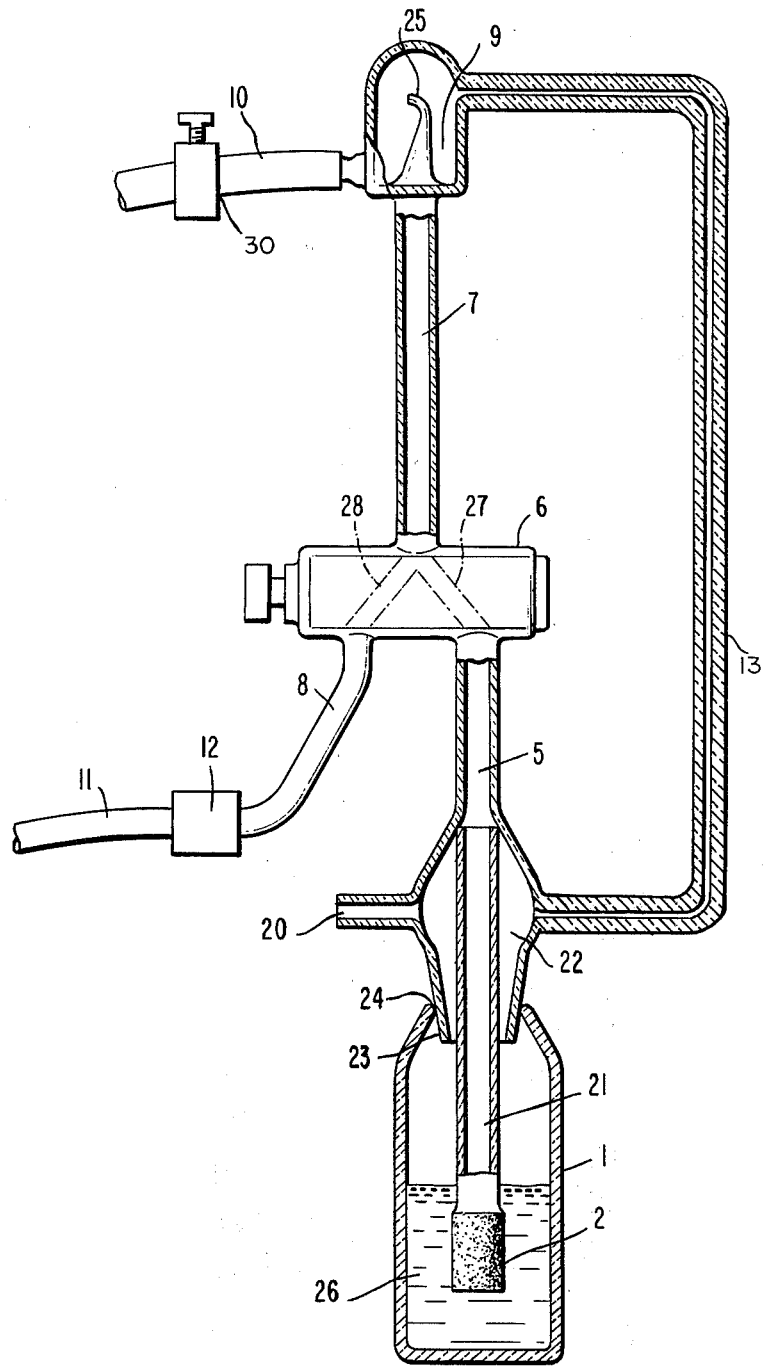

FILTERING APPARATUS

CROSS-REFERENCE TO RELATED APPLICATIONS

The present application is a continuation-in-part of U.S. application Ser. No. 186,283, filed Oct. 4, 1971, now abandoned.

FIELD OF THE INVENTION

The present invention relates to an improved filtering device and more particularly to an automatic, continuous filter apparatus which aliquots and separates filtrates from precipitates.

BACKGROUND OF THE INVENTION

The utilization of a filter means to separate solids from liquids is, of course, well known. It has also been proposed to automatically filter such solid-liquid mixtures. However, there has heretofore not been provided a satisfactory device which will both aliquot and filter. Often the liquid filtrate obtained from the liquid-solids prefiltration mix is subject to further testing and/or analytical procedures for chemical or medical purposes. While automatic filtration apparatus would be very helpful in procedures of this type, particularly when substantial numbers of filtrate samples are necessary, it has heretofore been generally necessary to conduct such filtration by manual procedures.

Such manual procedures have been considered necessary because of the degree of accuracy required -- which is not always available with automatic filtering apparatus -- and to reduce the possibility of introducing an impurity into the filtrate. Manual procedures for obtaining aliquot filtrates, as is well known, involve the use of filter paper, funnels, pipets and collecting tubes, all handled by technicians or scientists. Such manual procedures are time-consuming and slow, cumbersome and expensive.

SUMMARY OF THE INVENTION

It is, accordingly, an object of the present invention to obviate the defects of the prior art.

It is another object of the present invention to provide for obtaining aliquot filtrates in an improved, faster and less expensive manner.

It is a further object of the present invention to provide an automatic filtering apparatus which is adapted to deliver a particular quantity of the filtrate.

It is a further object of the invention to provide an automatic, all glass, continuous filtering apparatus.

It is yet another object of this invention to provide an automatic filtering apparatus which rapidly provides a measured amount of filtrate whereby the number of samples provided per time unit are substantially increased.

These and other objects and the nature and advantages of the invention -- which will be more apparent from the detailed description of an embodiment -- are generally achieved by providing an automatic filtering and delivering apparatus which comprises: (a) means for introducing a solid-liquid mixture to a filter, such means including provision for positive air pressure; (b) filter means for separating a liquid filtrate from the liquid-solid mixture; (c) means for transferring the filtrate from the filter to a receiving means; (d) receiving means defining a particular quantity of such filtrate; (e) means connected to said receiving means for transferring the particular quantity of filtrate to a delviery means; and (f) delivery means for delivering the particular quantity of such filtrate.

BRIEF DESCRIPTION OF THE DRAWING

The invention will be further described with reference to the accompanying FIGURE which is a representation of an illustrative embodiment of an automatic filtering and delivering apparatus in accordance with the present invention.

DESCRIPTION OF A PREFERRED EMBODIMENT

Referring to the FIGURE, a solid-liquid mixture 26 is introduced into the automatic filtering apparatus through a suitable introduction means 1 whereby the mixture contacts a filter means 2. The introduction means 1 can, for example, be an open-topped tube or other container for holding the mixture to be filtered. The tube can, for example, be a collecting tube in which the sample is originally collected thus avoiding possible transferences between a collecting tube and a pipet or the like prior to filtration. As is readily apparent, the more often a sample is handled and transferred, the more chances there are for the possible introduction of extraneous materials.

Preferably the filter means 2 is a sintered glass or Teflon filter body, although any suitable filter may be used. It is also preferred that the introduction means 1, and all other components of the invention, be formed of glass and that no extraneous material, such as a sealant, be used whereby the filtrate contacts only an inert glass surface in the filtering apparatus of the present invention. The automatic filtering apparatus is thus preferably all-glass and glass-sealed. Of course, other inert materials may be used if desired.

Filtration of the solid-liquid mixture through the filter means 2 is effected by applying positive air pressure to the solid-liquid mix. For example, positive air pressure can be introduced through an air inlet 20, into an air pressure reservoir 22. The filter 2 is disposed at the bottom end of a filtration inlet tube 21 which has an outer diameter smaller than the inner diameter of the bottom portion 23 of the air pressure reservoir 22. Alternatively, other air passage means may be provided between the reservoir 22 and the introduction container 1. The bottom portion 23 of the air pressure reservoir is adapted to fit into and form a sealed joint 24, preferably glass sealed, with the open top of the introduction container 1. In this manner, the positive air pressure established in the air pressure reservoir 22 is also established upon the top surface of the solid-liquid mixture 26.

In the illustrated embodiment, the filtration inlet tube 21 extends through the air pressure reservoir 22 to establish fluid communication between the filter means 2 and a suitable line 5. A sealed joint, preferably glass sealed, is provided between the reservoir 22 and the line 5 to prevent air pressure leakage. The liquid is thus forced through the filter and the separated liquid filtrate is further handled in the apparatus of the present invention as described hereinbelow. The separated solid can be removed for disposal and/or ultimate recovery depending upon the nature of the material.

The liquid filtrate is transferred via the filtration inlet tube 21 and line 5 to the three-way stop-cock 6 which is capable of providing, in one position, a flow path 27 for the filtrate between the line 5 and a receiving means 7. In its other position, the stop-cock 6 provides a flow path 28 between the receiving means 7 and a delivery means 8, which is described in greater detail hereinbelow.

The receiving means 7 can advantageously be a pipet adapted to define a particular quantity of the filtrate. The particular quantity can, for example, be the volumetric amount of a required sample when the filtering apparatus of the present invention is utilized in conjunction with an analytical testing program. The receiving means 7 further includes an overflow reservoir 9 which is adapted to receive any filtrate transferred to the receiving means in excess of that necessary to provide that particular quantity desired, i.e. any amount in excess of the volume of the pipets 7 will overflow into the reservoir 9.

The receiving means 7 prefereably terminates as a nozzle 25 disposed within the overflow reservoir 9. The nozzle 25 insures greater accuracy and precision in the filling of the receiving means 7. In addition, the delivery end of the nozzle can be inclined or pointed towards a suitable waste disposal means 10 -- such as a waste line --, provided to remove any excess filtrate, to thereby direct any overflow liquid into the overflow reservoir 9 towards such waste disposal means 10.

The filtrate in the receiving means 7 can thereupon be transferred to the delivery means 8 by manipulation of the three-way stop-cock means 6 to the second position 28 as described above. The quantity of filtrate is thus transferred to the delivery means 8 which is advantageously connected with a suitable outlet means 11. The outlet means 11 is preferably connected to the delivery means 8 with a suitable connecting means, such as a spring-operated, tubeholding-block schmatically shown at 12 and made of an inert, noncontaminating material such as Teflon. The particular quantity of filtrate desired is thus delivered through the outlet means 11 for analysis or the like.

The transference of the filtrate from the receiving means 7 through the three-way stop-cock 6, delivery means 8 and outlet means 11 can be assisted by a pressure connector 13 which provides a communication path for positive air pressure introduced via the air line 20 to air pressure reservoir 22 and the overflow reservoir 9. Consequently, the contents of receiving means 7 may be more rapidly dispensed than if gravity alone is operating. Also, by means of air pressure from connector 13, the dispensed aliquot from chamber 7 may be completely discharged, that is, the final drop of liquid contained in line 11 is forced out (analogously to blowing a pipet to clear the tip).

The pressure connector 13 must be of very small diameter, preferably capillary size tubing, so that the pressure in reservoir 22, supplied by wide-bore pressure inlet 20, is greater than the positive pressure supplied to receiving means 7 and line 5 via narrow-bore pressure connector 13. The small positive air pressure provided at the top of the filtrate, at the overflow reservoir 9 by the pressure connector 13, forces the filtrate out of the apparatus, thus assisting in transferring the filtrate along the flow paths defined below.

The pressure connector 13 is highly advantageous and is very important in allowing rapidity of operation and complete discharge of the fluid aliquots. The latter is important in that a volumetric container is generally more reproducible when operating to contain than when operating to deliver. The pressure connector 13 eliminates this problem. There is also less carryover or contamination to subsequent samples when all material is discharged.

It should be understood that for pressure connector 13 to be effective, a slight pressure head, which will resist free air flow, must be established in waste discharge tube 10. This can easily be accomplished by letting tube 10, or an extension thereof (not shown) lead into a waste container with liquid so that the line end will be submerged under liquid. There will thus be provided a slight pressure head. A greater or lesser pressure head can readily be obtained by several means, including constriction by a small orifice linkage somewhere in line 10 or the use of a constriction means such as screw clamp 30.

In operation, with the stop-cock means in the first position 27, the solid-liquid mixture is filtered and liquid filtrate is collected in the receiving tube. Excess filtrate is discharged through the overflow reservoir and waste line. When a sample is desired, the stop-cock 6 is adjusted to the second position 28 and a filtrate sample of the particular volumetric quantity desired is obtained from the outlet means. The stop-cock means is returned to the first position and the receiving means filled anew.

The filtering apparatus of the present invention can be supported by any suitable support means such as known in the art in appropriate position. Advantageously, the filtering apparatus can be supported on a work surface adjacent an analytical processing apparatus.

As an example of usage, the filtering apparatus of the present invention may be suitably used in filtering silicic acid-chloroform suspensions in the determination of triglycerides. The present invention can provide filtrate samples for triglyceride analysis at about twice the rate possible with manual procedures.

The apparatus of the present invention is also suitable for use in a number of liquid-solid separations. The invention is thus not restricted to the embodiments described and shown in the FIGURE and many alterations and modifications may be made without departing from the invention. For example, the pressure connector 13 and its function may be eliminated altogether. The device will still be operable to quickly and inexpensively automatically provide a liquot quantities of filtrate from a solid-liquid mixture.

What is claimed is:

1. A device for filtering solids from solid-liquid mixtures and for dispensing aliquot portions of the filtrate, comprising:

container means for containing the solid-liquid mixture;

filter means, within said container means, for separating the liquid filtrate from a solid-liquid mixture;

air pressure means for introducing positive air pressure to the surface of the mixture within the container and for forcing the liquid filtrate through said filter means;

receiving means of defined volume, connected to one side of said filter means, for receiving and storing an accurately reproducible aliquot of the filtrate, said receiving means comprising a receptacle connected at the bottom to said filter means and open at the top;

delivery means for delivering the aliquot of the filtrate from said receiving means; and a single valve means located at the bottom of said receptacle above said filter means for alternately controlling the flow of the filtrate first from the filter means to said receiving means while stopping the flow of the filtrate from said receiving means to said delivery means, and secondly from said receiving means to said delivery means while stopping the flow of the filtrate from said filter means to said receiving means, whereby the valve means is first placed in the first position so that filtrate from the container is forced through said filter means into said receptacle until the filtrate overflows the receptacle, and then the valve means is placed in a second position so that no further filtrate can enter the receiving means and the aliquot of filtrate filling said receptacle above said valve means to the open top thereof is delivered therefrom by means of said delivery means.

2. A device in accordance with claim 1 wherein said air pressure means comprises a source of positive air pressure, an air reservoir connected to said source, and an air passage from said air reservoir to said container.

3. The apparatus of claim 1 wherein said receiving means further includes an overflow reservoir to receive filtrate in excess of the particular quantity desired which overflows the open top of said receptacle.

4. The apparatus of claim 3 wherein said overflow reservoir is connected to a waste line whereby said excess is removed from the overflow reservoir.

5. A device in accordance with claim 3 wherein said air pressure means further includes means to provide a small positive air pressure to said overflow reservoir said small positive air pressure being less than said air pressure provided to the surface of said solid-liquid mixture, whereby the small positive air pressure aids in delivering the aliquot from the receiving means through said delivery means.

6. A device in accordance with claim 5 wherein said means to provide small positive pressure comprises a pressure reducer and connector means between said air pressure means and said overflow reservoir.

7. A device in accordance with claim 6 wherein said pressure reducer and connector comprises narrow-bore tubing of a bore which is narrower than that of said means to deliver positive air pressure to the surface of the solid-liquid mixture.

8. The apparatus of claim 1 wherein the filter means is a sintered glass filter body.

9. The apparatus of claim 1 wherein each said means in contact with the solid-liquid mixture and liquid filtrate is glass.

10. The apparatus of claim 3 wherein the open end of said receptacle terminates in a nozzle disposed within said overflow reservoir.

11. The apparatus of claim 10 wherein said nozzle means is inclined or pointed away from the vertical.

* * * * *